Oct. 17, 1950     O. H. SMITH     2,525,965
MOLDING METHOD
Filed Jan. 30, 1948

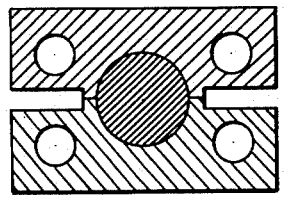
STEP 1. SUBSTANTIALLY FILL MOLD WITH PLASTISOL AND BLOWING AGENT

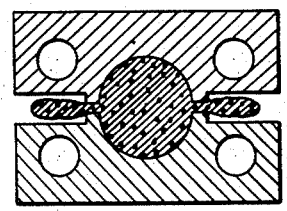
STEP 2. TO INITIATE BLOW HEAT AT LOW PRESSURE ALLOWING SEEPAGE OF EXPANDING MIX FROM MOLD

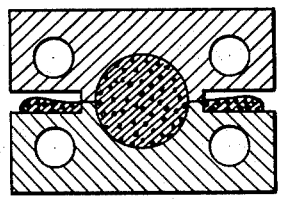
STEP 3. INCREASE PRESSURE TO PREVENT SEEPAGE, AND CONTINUE HEATING TO COMPLETE BLOW

STEP 4. COOL AND REMOVE FROM MOLD

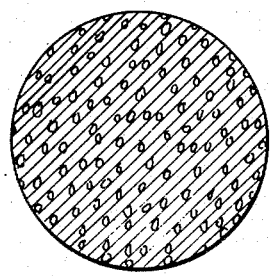
STEP 5. EXPAND BY HEATING TO FINAL SHAPE

INVENTOR.
OMAR H. SMITH
BY
Robert J. Patterson
ATTORNEY

Patented Oct. 17, 1950

2,525,965

UNITED STATES PATENT OFFICE 2,525,965

MOLDING METHOD

Omar H. Smith, West Englewood, N. J., assignor to United States Rubber Company, New York, N. Y., a corporation of New Jersey Application January 30, 1948, Serial No. 5,249

8 Claims. (Cl. 18—55)

This invention relates to a method of producing articles of expanded or cellular material. More particularly, this invention relates to an improved method of producing shaped articles of expanded vinyl resins, whereby articles which are coherent and free from surface defects are obtained. The invention relates to the production of closed-cell, gas-expanded articles wherein the cells do not communicate with one another, in contrast to a sponge or open-cell type of product.

Heretofore, one practice in the art of producing shaped articles of expanded vinyl resins, such as polyvinyl chloride, has been as follows: A mixtur of polyvinyl chloride and a plasticizer is formed and a blowing agent is introduced. A mold having the shape of the desired article is filled with the resin mixture containing the blowing agent and, after the mold is closed tightly by the application of high pressure, the composition is "preheated," that is, heat is applied to the mold to cause the blowing agent to decompose or gasify. A high external pressure is maintained on the mold in an effort to hold it closed against the internal pressure of the generated gas. After the blowing agent has gasified, the mold is cooled, the pressure is released, and the article is removed from the mold. At this stage the article has been only partially expanded, and the gas is contained in very small pores within the plasticized resin. The thus preheated and cooled article may be readily caused to expand further to many times its original size, to form a very light cellular material while still retaining its shape, by heating it, as by placing it in warm water or in heated air or in any other heated fluid medium in which it is free to expand, so that the thermoplastic resin softens and the pressure of the gas causes the pores to become greatly enlarged. Upon cooling, the article retains its expanded shape.

In practical operation it is found that when using the method just described it is generally not possible to maintain the external pressure on the mold during the heating operation sufficiently high to prevent amounts of the stock or of the gas from being violently expelled at the junction of the mold sections. Since a gas cannot be confined at a finite pressure in zero volume, the pressure of the gas generated by the blowing agent continues to build up within the mold until it exceeds the pressure exerted on the mold by the hydraulic press, whereupon the mold opens slightly and gas and plastic are expelled violently. The expulsion of even a very small amount of material in this manner results in the formation of ugly recessions or splits at the mold seam on the surface of the expanded article.

If it is attempted to reduce the pressure of the gas in the mold by filling the mold only partially with the expansible resin paste or plastisol, so as to provide free space for retention of the generated gas, it is found that the finally expanded article is not coherent, that is, large gas pockets are formed and the expanded article may split apart.

According to the present invention, coherent shaped articles which are free from surface recessions are obtained by filling the mold substantially entirely with the expansible resin paste comprising a plastisol of resin particles and plasticizer, and a blowing agent, and then applying a limited external pressure to the mold during the initial stage of the heating operation, so that a small amount of stock is permitted to escape from the mold while the internal gas pressure is still low (before a considerable portion of the gas has been generated from the blowing agent), and thereafter continuing the heating while applying sufficient pressure to prevent further seepage from the mold while the remainder of the gas is generated from the blowing agent. After the mold is cooled and the shaped article is removed and expanded in the usual manner, it is found that the article is entirely coherent and free from surface recessions.

I have found that in applying this novel method, which I call the "step-pressure" method, the maximum external pressure required in the later stage of the heating is considerably lower than the excessively high pressure required to give even poor results in the conventional method. The important practical advantages of employing lower pressures are that less expensive presses are required, and that with a press of a given pressure capacity a greater number of articles may be molded at one time.

For instance, when the heating operation is carried out in the conventional manner in a hydraulic press, a pressure equivalent to 24,000 p. s. i. is required, based on the "projected area" of the mold cavity (i. e., the maximum cross sectional area of the mold cavity at right angles to the direction of application of pressure), in order to produce articles which are reasonably free from major surface splits. When employing the same expansible resin compound and carrying out the heating by my step-pressure method, it is found that a pressure of only 4,000 p. s. i. is required to produce articles having perfectly smooth surfaces free from splits and recessions.

It is undesirable to permit an excessive amount of seepage from the mold cavity to occur during the initial low-pressure stage of the heating, as excessive seepage results in the production of articles having large pores and an undesirable grainy surface. Generally a seepage of 2 to 15% by volume of the contents of the mold cavity should be permitted, after which the pressure on the mold is raised to a figure usually ranging from 4 to 6 times, conveniently 5 times, the initial level, so as to retain the remainder of the gas in the plastic.

It will be understood that in practicing my invention I employ a sectional mold, usually one of two sections, that the external pressures referred to are the ram or mold-closing pressures exerted on the several sections to push them together into closed relation, and that the escape of the mixture during the early part of the heating period takes place by way of seepage between adjacent sections of the mold.

The method of my invention may be applied to other commercially available thermoplastic materials besides polyvinyl chloride, such as copolymers of vinyl chloride containing a major portion of copolymerized vinyl chloride (for example vinyl chloride-vinyl acetate copolymers especially those made from 85–95% vinyl chloride and correspondingly 15–5% vinyl acetate), and mixtures of polyvinyl chloride with other thermoplastic resins. Other commercially available resins such as polyvinyl acetate, polyvinyl butyrate, etc., polyvinyl alcohol, polyvinyl acetals such as polyvinyl formal, polyvinyl butyral, etc., poyvinylidene chloride, copolymers of vinylidene chloride and vinyl chloride, polyvinyl aromatic compounds such as polystyrene, polydichlorostyrene, poly-alphamethylstyrene, etc., acrylic compounds such as polymethylacrylate, polyethylacrylate, polymethylmethacrylate, etc., likewise may be employed.

An excellent blowing agent for use in the process is $a,a'$-azobisisobutyronitrile. Other nitrogen-producing blowing agents may be used, examples being diazoaminobenzene, 1,3-bis(o-xenyl)-triazene, 1,3-bis(p-xenyl)-triazene, etc. Nitrogen-producing blowing agents are preferred for expanding soft materials such as plasticized polyvinyl chloride since the nitrogen gas, because of the large proportion of nitrogen in the outside air, leaks out of the cells very slowly after the pressure in the cells is reduced to atmospheric pressure. Blowing agents which produce other gases such as ammonia or carbon dioxide, which tend to leak out of the cells rapidly, may be employed with resin compositions which are hard and rigid enough after cooling to retain their cellular structure against the pressure of the atmosphere. Commonly used blowing agents which may be employed are, e. g., sodium bicarbonate and oleic acid; ammonium carbonate; mixtures of ammonium chloride and sodium nitrite, etc.

Dioctyl phthalate and tricresyl phosphate are illustrative of the plasticizers which may be employed in my process with polyvinyl chloride or copolymers made with vinyl chloride as one monomer. Other plasticizers may be employed, for example, dibutyl phthalate and other high-boiling esters, ethers, ketones, and other plasticizers known to the industry may be used. Mixtures of plasticizers may be used.

The quantity of plasticizer used should be sufficient to form a butter-like plastisol or paste. The proportion of plasticizer employed may range from ½ to 4 parts per part of the resin. Usually a proportion of from 65 to 100 parts of plasticizer per 100 parts by weight of polyvinyl chloride is employed.

The quantity of the blowing agent employed will vary with the density or degree of cellularity desired in the final article and the particular blowing agent employed. Generally from 12 to 40 parts, for example, of $a,a'$-azobisisobutyronitrile per 100 parts by weight of resin are suitable.

It is also advantageous to employ a small quantity of a heat or light stabilizer, such as 2 to 5 parts of calcium stearate per 100 parts by weight of polyvinyl chloride.

The plasticizer, the powdered polyvinyl chloride and other ingredients may be mixed at room temperature to form a butter-like plastisol or paste which is capable of being gelled by heating a short time at elevated temperatures (e. g., 200–350° F.).

The plasticizer, as is well known in the resin industry, should be of such nature and should be used in such amount that upon heating of the mixture of powdered resin and plasticizer (i. e., the plastisol) to elevated temperatures at which the blowing agent generates gas, the plasticizer will dissolve the resin and give a solution or gel which upon cooling yields a product which is hard and solid at ordinary temperatures such as those to which the expanded product is subjected in service.

The time and temperature of the heating operation will vary with the blowing agent employed. The temperature should be sufficiently elevated to both decompose the blowing agent and cause the plasticizer to dissolve the resin. When using the preferred blowing agent, $a,a'$-azobisisobutyronitrile, the heating step may be carried out at a temperature from 220° to 350° F. for from 6 to 15 minutes. In the initial stage of the heating the external pressure on the mold should be about 400 to 2000 p. s. i. (based on the projected area of the mold cavity), so that a small amount of seepage from the mold is permitted. After about one to three minutes, or when about 2 to 15%, preferably from 5 to 10%, of the resin composition has seeped from the mold and before a considerable portion of the gas has been liberated, the external pressure is increased to a substantially higher pressure which is sufficient to prevent further seepage and which is within the range of from 2,000 to 10,000 p. s. i., and heating under pressure is continued for 5 to 10 minutes or until the decomposition of the blowing agent is substantially complete.

Referring to the accompanying drawing which illustrates diagrammatically the method of my invention, the mold cavity is first substantially filled with the paste or slurry made up of unplasticized fine particles of the thermoplastic resin dispersed in a continuous phase of a plasticizer capable of dissolving the resin upon heating to form a gel which upon cooling has sufficient hardness and rigidity to retain its shape and expanded structure, and also containing a suitable amount of a blowing agent. This step is indicated as step 1 on the drawing. The mold halves are then closed under relatively low pressure such as to allow limited seepage during the early part of the blowing step, and heating is begun, as by circulating a heating medium through the mold halves, to initiate blowing by causing the blowing agent to generate gas. As illustrated in step 2, the closing pressure exerted on the mold halves is so limited that seepage of a small portion of the expanding mix takes place as the blowing agent begins to decompose. The material which overflows escapes into the annular space surrounding the normally contacting surfaces of the mold halves and forms an irregular mass in this annular space. After seepage of a limited amount, preferably not over 15%, of the expanding mix in this manner, the closing pressure on the mold sections is increased to such an extent that seepage is stopped and further expansion and seepage are prevented by virtue of the mold halves coming together into substantial contact with one another. In practice a very thin film of the material may remain between the meeting faces of the mold halves but this does not interfere with the attainment of an effective seal under the relatively higher mold-closing pressure maintained in step 3. Heating is continued throughout step 3 to complete the decomposition of the blowing agent. The molded article is then cooled, as by circulating a cooling medium through the mold halves, and removed from the mold, as indicated by unillustrated step 4, and is then expanded to final shape by heating it outside the mold, as by immersion in heated water in the manner described above, to give the final expanded article illustrated in connection with step 5.

The following example illustrates the invention in more detail. Parts are by weight.

*Example*

The following ingredients were mixed on a three-roll paint mill until a smooth mixture of butter-like consistency was obtained:

| | |
|---|---|
| Powdered polyvinyl chloride | 100 |
| Tricresyl phosphate | 85 |
| a',a'-azobisisobutyronitrile | 20 |
| Calcium stearate | 3 |

Two halves of a mold, each having a hemispherical cavity 1¼ inch in diameter, were filled with a small excess of the above paste. The mold halves were placed together and inserted in a hydraulic press having steam-heated platens. A ram pressure of 800 lbs. per sq. in. of projected mold area was applied for 1.5 minutes at a mold temperature of about 260° F. During this time there was partial decomposition of the blowing agent, and about 10% (by volume) of the stock seeped from the mold. The ram pressure was then raised to 4,000 p. s. i. to prevent further seepage. Heating was continued for 6..5 minutes at a mold temperature of 320° F. to complete the decomposition of the blowing agent. The mold was then cooled by running cool water through the press platens for about 8 minutes; the pressure was then released and the solid plastic sphere was removed from the mold. The sphere was then placed in hot water at 185° F., causing it to expand to a diameter of about 2.0 inches. The cellular sphere had a smooth, flawless surface, and was free from internal discontinuities. The density of the expanded article was about 3.5 lbs./cu. ft.

The term "plastisol" is used herein with the meaning which has become well-established in the art. See for example the article "A New Technique in Coatings," by G. M. Howell and R. W. Quarles, appearing in "Official Digest," published by the Federation of Paint and Varnish Production Clubs, issue #263, December, 1946, which contains a thorough exposition of the nature and properties of plastisols. Reference may also be made to Modern Plastics Encyclopedia, 1947, vol. 1, pages 140 and 484, published by Plastics Catalogue Corporation, New York, and to British Patent No. 500,298, which however effects the gelatinization of the plastisol without the application of pressure.

Having thus described my invention, what I claim and desire to protect by Letters Patent is:

1. The process of making a closed-cell gas-expanded thermoplastic resin article which comprises substantially completely filling a mold cavity formed by a sectional mold with an expansible resin mixture comprising a plastisol of particles of a thermoplastic resin and a plasticizer therefor and also containing a blowing agent, completely closing said mold, heating the mixture in the closed mold sufficiently to initiate generation of gas from the blowing agent, applying a limited mold-closing pressure to the mold during the initial portion of said heating step, said pressure being so limited that the pressure of the generated gas in the mixture acts to separate the mold sections sufficiently to permit a small amount of the mixture to escape by seepage from the mold, thereafter increasing the mold-closing pressure sufficiently to stop seepage and prevent further seepage from the mold while continuing said heating to complete generation of gas from the blowing agent, cooling and removing the shaped article from the mold, and expanding it to final closed-cell gas-expanded form by heating it outside the mold.

2. The process of making a closed-cell gas-expanded thermoplastic resin article which comprises substantially completely filling a mold cavity formed by a sectional mold with an expansible resin mixture comprising a plastisol of particles of a thermoplastic resin and a plasticizer therefor and also containing a blowing agent, completely closing said mold, heating the mixture in the closed mold sufficiently to initiate generation of gas from the blowing agent, applying a limited mold-closing pressure to the mold during the initial portion of said heating step, said pressure being so limited that the pressure of the generated gas in the mixture acts to separate the mold sections sufficiently to permit at least 2% but not over 15% by volume of the contents of the mold cavity to escape by seepage from the mold, thereafter increasing the mold-closing pressure sufficiently to stop seepage and prevent further seepage from the mold while continuing said heating to complete generation of gas from the blowing agent, cooling and removing the shaped article from the mold, and expanding it to final closed-cell gas-expanded form by heating it outside the mold.

3. The process of claim 1 wherein said resin is polyvinyl chloride.

4. The process of claim 1 wherein said resin is a vinyl chloride-vinyl acetate copolymer.

5. The process of claim 1 wherein said resin is a vinyl chloride-vinylidene chloride copolymer.

6. The process of claim 1 wherein the pressure applied during the later portion of said heating step is from 4 to 6 times that applied during the initial portion thereof.

7. The process of claim 1 wherein said blowing agent is a chemical blowing agent capable of decomposing with generation of nitrogen gas during said heating step.

8. The process of making a closed-cell gas-expanded polyvinyl chloride article which comprises substantially completely filling a mold cavity formed by a sectional mold with an expansible resin mixture comprising a plastisol of powdered polyvinyl chloride and a plasticizer therefor capable of forming a gel during the heating step described hereinafter, together with α,α'-azobisisobutyronitrile, said mixture containing from 65 to 100 parts of said plasticizer per 100 parts of polyvinyl chloride and from 12 to 40 parts of said α,α'-azobisisobutyronitrile per 100 parts of polyvinyl chloride, completely closing said mold, heating the mixture in the closed mold to a temperature of from 220° to 320° F. to initiate generation of gas from said α,α'-azobisisobutyronitrile, applying a limited mold-closing pressure of from 400 to 2000 pounds per square inch based on the projected area of the mold cavity to the mold during the initial portion of said heating step, said pressure being so limited that the pressure of the generated gas in the mixture acts to separate the mold sections sufficiently to permit a small amount of the mixture to escape by seepage from the mold, and then, after at least 2% but not more than 15% by volume of the contents of the mold has seeped therefrom, increasing the mold-closing pressure to a substantially higher pressure within the range of from 2,000 to 10,000 pounds per square inch based on the projected area of the mold cavity, thereby to stop said seepage and prevent further seepage, while continuing said heating to complete generation of gas from said blowing agent, cooling and removing the shaped article from the mold, and expanding it to final closed-cell gas-expanded form by heating it outside the mold.

OMAR H. SMITH.

REFERENCES CITED

The following references are of record in the file of this patent:

UNITED STATES PATENTS

| Number | Name | Date |
| --- | --- | --- |
| 1,515,475 | Goodwin | Nov. 11, 1924 |
| 1,952,528 | Bedford | Mar. 27, 1934 |
| 2,283,316 | Cooper | May 19, 1942 |
| 2,291,213 | Cuthbertson | July 28, 1942 |
| 2,400,091 | Alfthan | May 14, 1946 |

OTHER REFERENCES

Goggin, British Plastics, December 1947, pp. 528–536.